United States Patent
Rusche et al.

(10) Patent No.: US 8,126,980 B2
(45) Date of Patent: *Feb. 28, 2012

(54) DUAL USE COUNTERS FOR ROUTING LOOPS AND SPAM DETECTION

(75) Inventors: Thilo Rusche, Arlington, VA (US); Derek Hung Kit Tam, Reston, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,945

(22) Filed: May 20, 2010

(65) Prior Publication Data

US 2010/0229237 A1    Sep. 9, 2010

Related U.S. Application Data

(63) Continuation of application No. 10/781,913, filed on Feb. 20, 2004, now Pat. No. 7,725,545.

(51) Int. Cl.
*G06F 15/16* (2006.01)
(52) U.S. Cl. .................................. 709/206
(58) Field of Classification Search .............. 709/203, 709/205, 206; 715/752
See application file for complete search history.

(56) References Cited

U.S. PATENT DOCUMENTS

| | | | |
|---|---|---|---|
| 5,371,732 A | 12/1994 | Brocken et al. | |
| 5,621,727 A | 4/1997 | Vaudreuil | |
| 6,052,458 A | 4/2000 | Amir-Ebrahimi | |
| 6,512,448 B1 | 1/2003 | Rincon | |
| 6,633,764 B1 | 10/2003 | Garcia | |
| 6,728,738 B2 | 4/2004 | Wolczko et al. | |
| 6,819,932 B2 | 11/2004 | Allison et al. | |
| 6,879,594 B1 | 4/2005 | Lee et al. | |
| 6,885,872 B2 | 4/2005 | McCann et al. | |
| 7,145,875 B2 | 12/2006 | Allison et al. | |
| 7,424,209 B2 | 9/2008 | Mazur | |
| 2004/0199592 A1 | 10/2004 | Gould et al. | |
| 2005/0198270 A1 | 9/2005 | Rusche et al. | |

FOREIGN PATENT DOCUMENTS

WO  02071234 A1  9/2002

OTHER PUBLICATIONS

PCT International Search Report and the Written Opinion, PCT/US2004/20053.

*Primary Examiner* — Yemane Mesfin
(74) *Attorney, Agent, or Firm* — Edell, Shapiro & Finnan, LLC

(57) ABSTRACT

A method for detecting an undesirable condition within a messaging network. A message is received and a source of the message is identified. If an entry in a database for the source has not been created, an entry is created. A source counter for the source is then set to one and a timestamp is created for the source. If an entry in the database for the source has been previously created, the source counter is incremented by one and the timestamp is updated. The source counter is then compared to a source threshold, and if the source counter exceeds the source threshold over the course of predetermined amount of time, a source alarm is triggered. A sliding with respect to the predetermined amount of time may also be implemented to account for total counts that may fall across or be split by set periods of time. The invention is particularly useful for detecting "spam" events and undesirable routing loops.

12 Claims, 4 Drawing Sheets

DUAL USE COUNTERS FOR ROUTING LOOPS AND SPAM DETECTION

This application is a continuation of U.S. application Ser. No. 10/781,913, filed Feb. 20, 2004, which is incorporated herein by reference in its entirety.

BACKGROUND

1. Field of the Invention

The present invention relates generally to detection of suspicious traffic patterns over a network. More specifically, the present invention relates to such detection in wireless messaging networks based, for example, on source and destination addresses and/or timing.

2. Background of the Invention

Spam is a problem that plagues much of today's communications networks and, particularly, telecommunications networks. As used herein, "spam" includes mass messaging from one or a small set of origination numbers associated with wireless devices, such as mobile telephones, that frequently contain unwanted or otherwise undesirable content. Spam often takes the form of an unusually large number of messages from a single source address to multiple recipients, and may be caused by applications that send messages to a wireless network via a telephone handset connected to a computer or wireless modem. In addition, spam may be defined as a large number of messages sent from a single source to a single destination address with no corresponding messages in the reverse direction. While not strictly considered spam in the traditional meaning, this may constitute, for example, a denial-of-service-like misuse of the messaging network that a carrier may want to be alerted to, or, it may also indicate an undesirable "routing loop".

As used herein, the term "routing loop" refers to a situation whereby one carrier, e.g., a mobile telephone network provider, recognizes a number as being out of its system and forwards the call or message associated with that number to another network, or an intermediary that logically bridges different networks. The intermediary (or other network), however, recognizes the number as belonging to the original carrier's system and sends the message back. This routing and re-routing can continue indefinitely.

Undesirable looping can often occur in the context of number portability (NP), whereby two entities, e.g., a wireless carrier and an inter-carrier vendor, in a message exchange environment have, at a given moment in time, different routing information for a specific telephone number. For example, the inter-carrier vendor may have received and processed a notification of a porting event for a telephone number via a real-time porting/pooling data feed, but the wireless carrier has, for any number of reasons, not yet updated its local routing information to reflect the notification. This conflict can result in the above-described message or routing loop.

In such a circumstance, the carrier will determine (incorrectly) that, for example, a Short Message Service (SMS) message that is addressed to a telephone number is outside of its network and will, accordingly, pass the message to the inter-carrier vendor for delivery. The vendor (or intermediary) will determine (correctly) that the telephone number has been ported to the carrier and should thus be serviced by that carrier and will, accordingly, return the message to the carrier for delivery. The message will then be bounced back and forth indefinitely without ever being sent to the intended recipient.

Both spam and routing loops create problems for carriers and customers alike. It would be desirable to identify, reduce and possibly even eliminate spam and routing loops within communication networks. This would be especially desirable within wireless communication networks that handle data such as SMS messages.

BRIEF SUMMARY OF THE INVENTION

The present invention relates, in one exemplary embodiment, to a method for detecting undesirable conditions within a messaging network. The method comprises receiving a message and identifying a source of the message. If an entry in a database for the source has not been created, an entry is created in the database for the source. A source counter for the source is set to one and a timestamp is created for the source. If an entry in the database for the source has been previously created, the source counter is incremented by one and the timestamp is updated. The source counter is then compared to a source threshold for a predetermined time period, and if the source counter exceeds the source threshold, a source alarm is triggered.

DETAILED DESCRIPTION OF THE INVENTION

In a preferred embodiment, the present invention monitors on-going message traffic between mobile communication subscribers in an effort to recognize patterns that may constitute spam, as defined above, or indicate a routing loop where a message is sent back and forth endlessly between two parts of a network or between networks. One of ordinary skill in the art will appreciate that the present invention should not be limited only to traffic between mobile communication subscribers, but could also apply to any network in which spam or routing loops may occur. By monitoring a network in accordance with principles consistent with those of the present invention, the presence of such undesirable situations may be more quickly identified, and thus more quickly remedied.

At its most basic level, the present invention endeavors to track source and destination numbers (e.g., telephone numbers or addresses) of all messages flowing between two networks, or within a single network in an appropriate manner for a time window of fixed size. In a preferred embodiment, a database or other memory store, stores the number of messages sent by a specific source address and a timestamp denoting the creation time of a given instance. When a message passes through the system, an appropriate data structure is created in the database (if not already present for a particular source address) and a counter is incremented, the counter being indicative of the number of messages sent from that particular source address.

Figure 1:
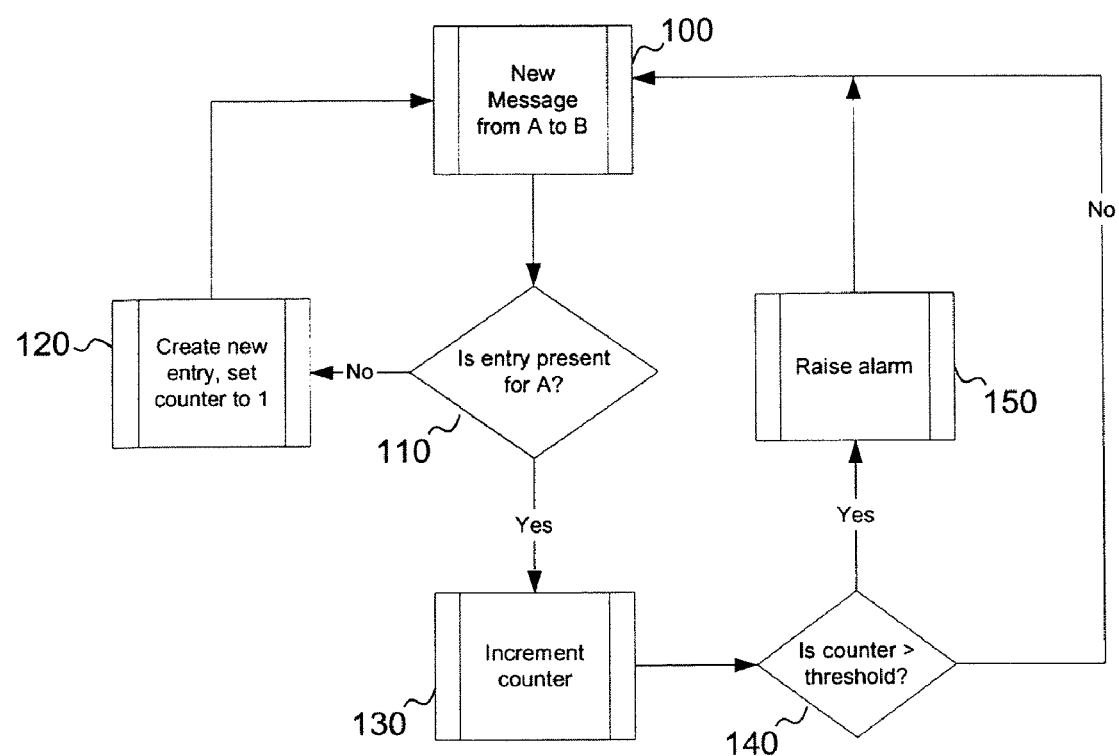
FIG. 1 is a flow chart showing an exemplary message counter incrementing process according to an exemplary embodiment of the present invention.

This process is shown in FIG. 1. Initially, a new message (e.g., an SMS from a mobile phone) is created at step 100 and sent from location A to location B. At step 110, the system checks whether an entry is present in the database for the originator, A. If an entry is not present, then at step 120, a new entry is created with a counter set at one and a timestamp is created. If an entry is already present, then at step 130 the counter is incremented and the time stamp is updated. Once the counter and timestamp are updated, a check with respect to a threshold is performed at step 140. If the counter value reaches or exceeds (depending on the setting) the threshold, then an alarm is sounded at step 150. If, however, the threshold has not been crossed, the system waits for the next message to be sent within the network or between networks.

With the counter and timestamp information, it is possible in accordance with the present invention to implement an efficient "jumping window" of fixed size by using a garbage collection method that removes all entries older than a fixed window size in regular intervals. For example, if thirty minutes have passed and the threshold has not been met, then the data collected during that thirty minute jumping window is discarded and the process starts anew. This solution has an advantage of being very efficient because the garbage collector routine needs only to compare one integer value (e.g., number of messages) per time period to determine whether to remove message history data or not. One disadvantage of this methodology lies in the nature of the fixed jumping window. It may be possible that a flurry of messages is sent in its entirety from a single source address that exceeds the identified spam threshold, but is sent, temporally, with respect to garbage collection, in such a way that two parts of the flurry each remain below the threshold or detection level.

Figure 2:
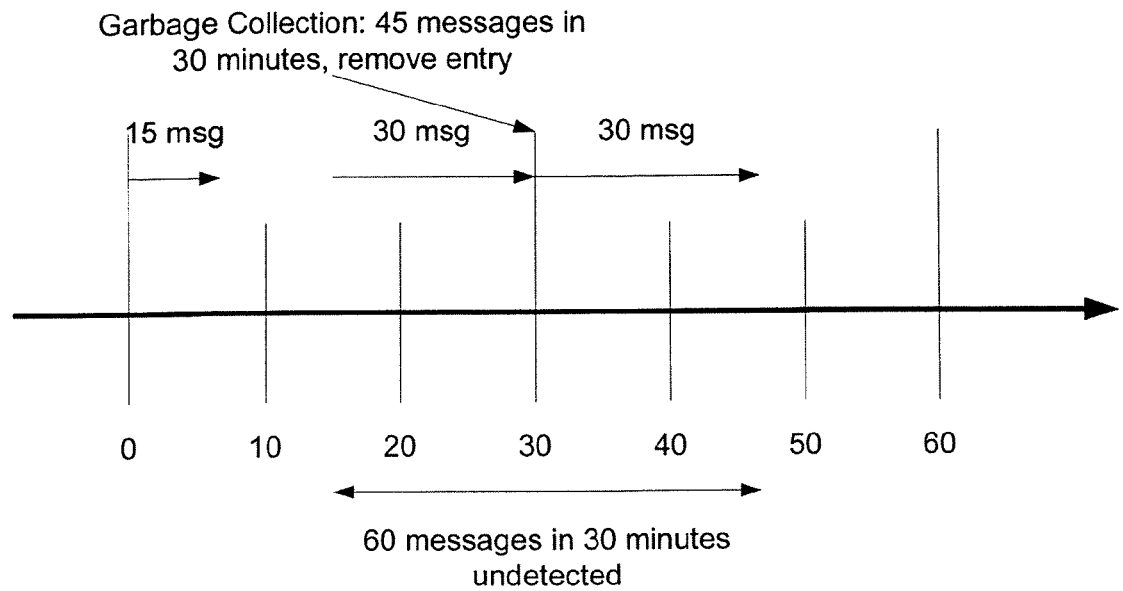
FIG. 2 is a timeline showing receipt of messages within a network.

This situation is shown in FIG. 2, wherein fifteen messages are depicted as being sent within, approximately, a seven minute period. Later, thirty more messages are depicted as being sent over the last fifteen minutes of the half hour. If the threshold were set to be fifty messages within a half hour, a typical system would not sound an alarm because garbage collection would be set to occur every half hour, thus wiping out all counter information during that period. At the beginning of the next half hour, another thirty messages are depicted as being sent over the first fifteen minutes. Because the garbage collection occurred at the thirty-minute mark, the system does not detect this as a spam instance even though, as is shown, sixty messages were sent in a thirty minute period. In essence, the fixed jumping window split in half what would otherwise have been detected as a spam instance thereby allowing the event to go undetected. Table 1 is illustrative of the garbage collection utilizing a fixed window.

TABLE 1

| Time Interval | Beginning Total | Number In | Intermediate Total | Time Interval Covered | Number Removed | Ending Total |
| --- | --- | --- | --- | --- | --- | --- |
| $T_0$ | 0 | 0 | 0 | N/A | 0 | 0 |
| $T_5$ | 0 | 10 | 10 | N/A | 0 | 10 |
| $T_{10}$ | 10 | 5 | 15 | N/A | 0 | 15 |
| $T_{15}$ | 15 | 0 | 15 | N/A | 0 | 15 |
| $T_{20}$ | 15 | 10 | 25 | N/A | 0 | 25 |
| $T_{25}$ | 25 | 10 | 35 | N/A | 0 | 35 |
| $T_{30}$ | 35 | 10 | 45 | All | 45 | 0 |
| $T_{35}$ | 0 | 10 | 10 | N/A | 0 | 10 |
| $T_{40}$ | 10 | 10 | 20 | N/A | 0 | 20 |
| $T_{45}$ | 20 | 10 | 30 | N/A | 0 | 30 |
| $T_{50}$ | 30 | 0 | 30 | N/A | 0 | 30 |

As can be seen in Table 1, when the window is fixed, an undesirable instance of message accumulation, or spam, occurs because the arrival of messages spans across two windows. To ensure that an alarm is sounded and such a spam instance is detected, a sliding window is preferably implemented. This sliding window is implemented with a more elaborate data structure in which the time stamp is replaced by a sorted array (or comparable data structure) of timestamps, one for each counter increment. The garbage collector removes all entries from this array that are older than the fixed window size, and decrements the counter accordingly. In this manner, only if the counter reaches zero is the complete data structure removed from the hash table.

A refined solution could therefore implement a "rolling" window. This requires a more elaborate data structure in which the timestamp and counter are replaced by a container of timestamps—e.g., a First-In-First-Out (FIFO) queue or other comparable structure. The garbage collector removes all entries from this container that are older than the fixed window size. Only if the last element is removed from the container is the container itself removed from the hash table. This enhanced spam detection using a sliding or rolling window is shown in Table 2.

TABLE 2

| Time Interval | Beginning Total | Number In | Intermediate Total | Time Interval Covered | Number Removed | Ending Total |
| --- | --- | --- | --- | --- | --- | --- |
| $T_0$ | 0 | 0 | 0 | N/A | 0 | 0 |
| $T_5$ | 0 | 10 | 10 | N/A | 0 | 10 |
| $T_{10}$ | 10 | 5 | 15 | N/A | 0 | 15 |
| $T_{15}$ | 15 | 0 | 15 | N/A | 0 | 15 |
| $T_{20}$ | 15 | 10 | 25 | N/A | 0 | 25 |
| $T_{25}$ | 25 | 10 | 35 | N/A | 0 | 35 |
| $T_{30}$ | 35 | 10 | 45 | $T_0$ | 0 | 45 |
| $T_{35}$ | 45 | 10 | 55 | $T_5$ | 10 | 45 |
| $T_{40}$ | 45 | 10 | 55 | $T_{10}$ | 5 | 50 |
| $T_{45}$ | 60 | 10 | 60 | $T_{15}$ | 0 | 60 |
| $T_{50}$ | 60 | 0 | 60 | $T_{20}$ | 10 | 50 |

Figure 3:
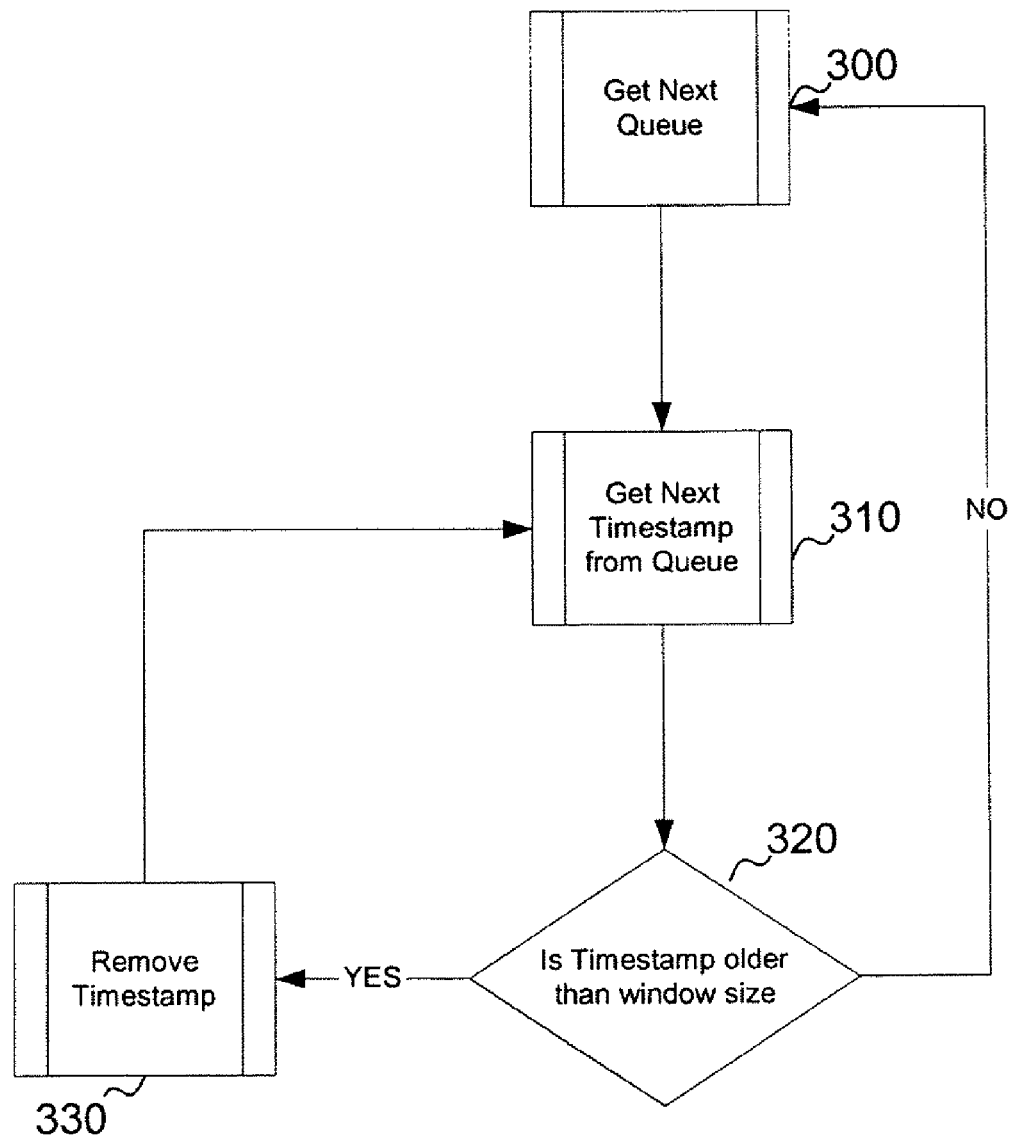
FIG. 3 is a flow chart depicting "garbage collection" using a sliding window according to an exemplary embodiment of the present invention.

With this sliding method, a slight performance penalty is encountered due to the relative complexity of an array search and the related counter decrement versus a simple integer comparison and periodic garbage collection. A more significant increase in memory space would also occur. The garbage collection process depicted in Table 2 is shown in FIG. 3. As shown, at step 300 the next queue is obtained. The 'queue', as used herein, represents the data structure that contains or houses the dynamically-changing set of individual entries, each individual entry representing those (SMS) messages that had been observed as originating from a particular source (A, B, . . . ). The garbage collection routine, an exemplary embodiment of which is shown in FIG. 3, would iterate through the entries in the queue to access all of the counters/timestamps as it completes its work. Next, at step 310 the time stamp associated with the queue is also obtained. The timestamp is then checked at step 320 to see if it falls within or outside of the predetermined window size. If the timestamp is outside of the window size, then that timestamp is removed at step 330. Otherwise, the procedure returns to step 300 to get the next queue. Because, however, the array of timestamps is always sorted, very efficient methods of array manipulation can be applied. In order to achieve this result, often a significant increase in memory space must be taken into consideration.

In a mobile telephone network environment that supports number portability, a user of one carrier is able to take his/her current phone number and use it in another carrier's network so as to avoid changing phone numbers in order to change carriers. Previously, carriers received a dedicated block of phone numbers making it easy for their systems to detect what numbers were part of their network and what numbers were outside of their network. Now, however, users have the ability to take their number from one carrier to the next, thus simplifying, on the user end, a change from one carrier to the other. As mentioned above, however, this number portability can create numerous problems for carriers.

Figure 4:
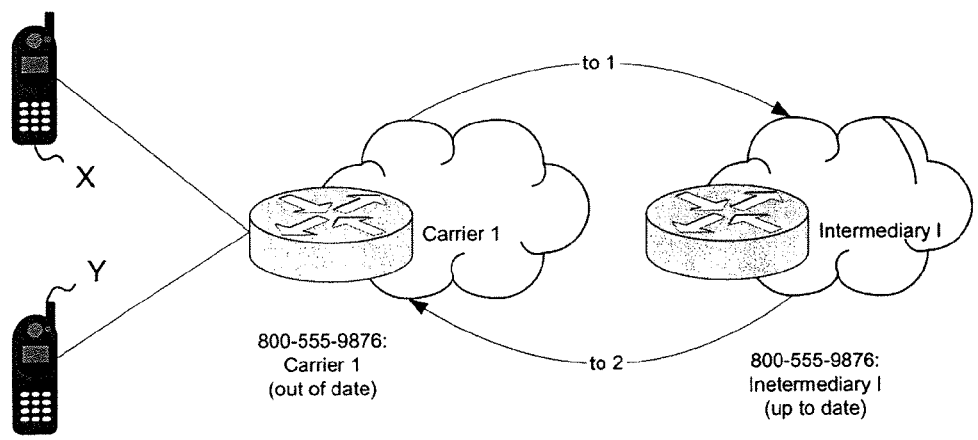
FIG. 4 is a diagram showing a routing loop situation.
Figure 4:
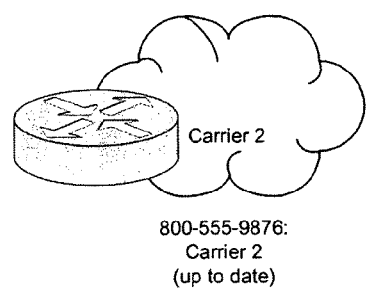

In a number portability situation, User Y (referring to FIG. 4) has taken its number from its original carrier, Carrier 2, to a new carrier, Carrier 1. As seen in FIG. 4, when User X, who is also with Carrier 1, sends a message to User Y, newly added to Carrier 1, for any of a number of reasons, Carrier 1 recognizes User Y (incorrectly) as being outside of its network. Carrier 1 then sends the message to an intermediary I for translation of the message to ensure proper transmission between carriers. Intermediary I subsequently recognizes (correctly) that User Y is, in fact, part of Carrier 1's network and sends the message back to Carrier 1 to send to User Y. This routing and re-routing will continue indefinitely due to the discrepancy between the information the carriers and intermediary have regarding User Y. This discrepancy results in a routing loop. If neither Intermediary I nor Carrier 1 has a mechanism to prevent sending messages back to the originating network, the message will stay in this routing loop indefinitely, or until some timer expires, and will never actually reach its destination.

In order to detect routing loops or excessive messaging between a single source and a destination, additional information needs to be tracked. Instead of incrementing a single counter per source address, the data structure for each source address is preferably also configured to contain separate counters for each destination address. To this end, the previously defined data structure can be modified to contain a hash table, or similarly indexed "container" for holding data structures of the same type, indexed by destination address. This allows the system to track more than just the total amount of messages from the source address. The modified tracking method is shown in FIG. 5.

Figure 5:
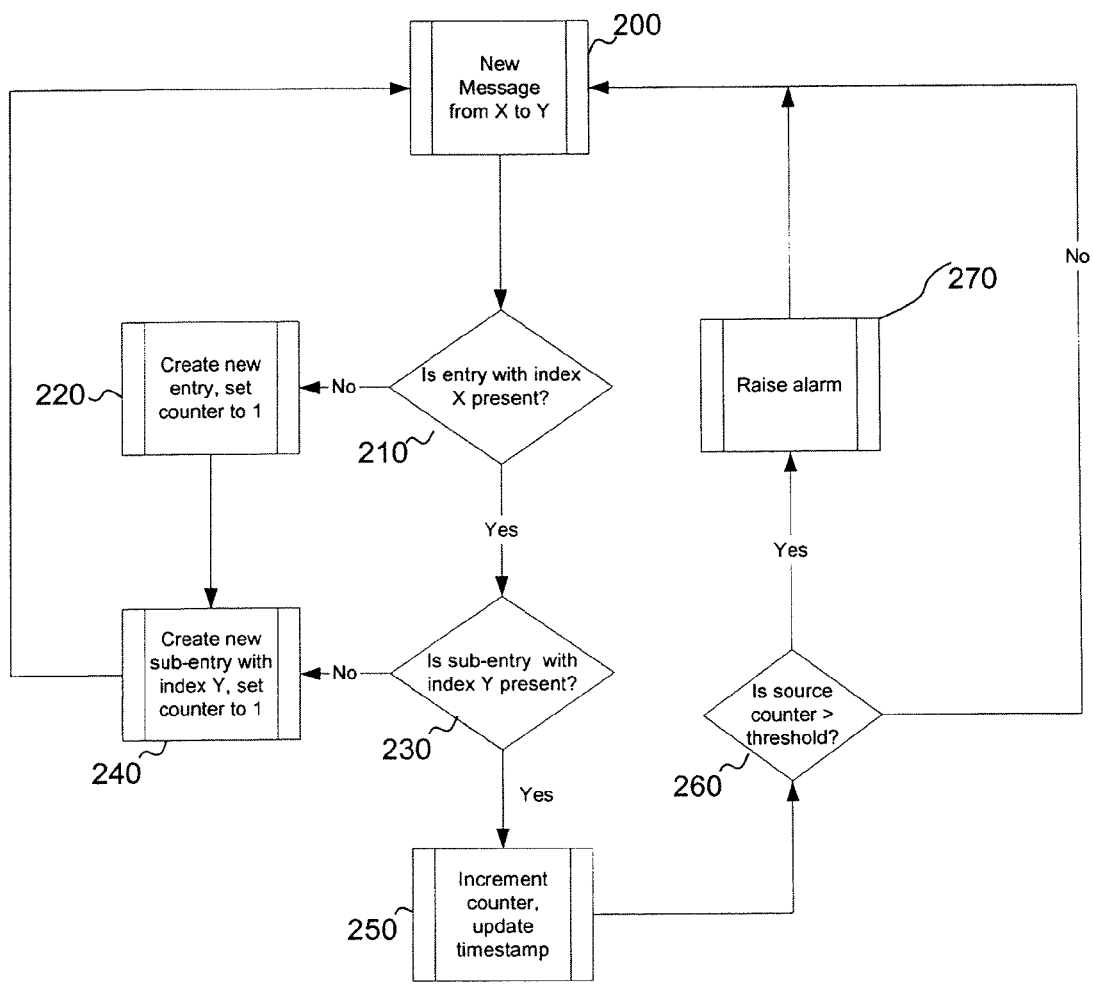
FIG. 5 is a flow chart showing an exemplary tracking method according to an embodiment of the present invention.

As seen in FIG. 5, a new message is sent from location X to location Y using a phone number shown at step 200. As with the method of FIG. 2, the system checks to see if an entry has been created for X at step 210. If it has not, then at step 220, a new entry is created with index X and with the counter set at one. Because this is a new entry for X, it can be assumed that no sub-entry has been created for Y, so at step 240, a new sub-entry is created with index Y. If an entry is present, however, rather than incrementing the counter at this time, the system checks if a sub-entry under X's main entry is present for Y at step 230. If a sub-entry for Y is not present, then at step 240 a new sub-entry for Y is created with the counter set to one. If a sub-entry for Y is present, then the counter is incremented and the time stamp updated at step 250. At this point, the counter is compared to a threshold at step 260 and, if the counter is greater than the threshold, an alarm is sounded at step 270. If the threshold is not met, then the system waits for the next message without sounding an alarm.

By adding this additional data, the monitoring mechanism of the present invention can be refined in several ways. First, different thresholds may be configured for a total number of messages per window and number of messages per destination address and window. Second, the alarm based on the total number of messages may contain a detailed breakdown of the different destination addresses and the associated message counts.

If the network into which this spam/routing loop detection method is to be introduced is of a distributed nature, there may be no single point through which all messages must pass. In such a situation there are at least two solutions. First, processes on separate hardware throughout the network may use a shared device, such as a solid-state disk, as the storage medium for all in-memory data structures. While this ensures an accurate count of message traffic through the network, it may significantly degrade performance compared to processes operating exclusively within local memory. This approach also may be impractical if the traffic is distributed over geographically separated networks.

In a second solution to the distributed networks problem, thresholds defined in respect to the total amount of traffic passing through a network can be divided by the number of locations where the invention is deployed. For example, if one hundred messages per hour are defined as the threshold per source address, two processes with a threshold of fifty messages per hour may be configured. While this approach may lead to a number of false alarms if the traffic is not load-balanced based on source address, practice has shown that for reasonably high thresholds, the usual approach of round-robin load balancing is sufficient to ensure a close approximation of the shared memory model.

Because it is practically unavoidable that legitimate use of the messaging network will result in false alarms using the monitoring described above, the system may be configured to add certain source or destination addresses, or combinations thereof, to a "white list" that is held in memory at all times. Messages that have a matching entry in the white list will not generate an alarm even if they exceed the configured thresholds. Similarly, source addresses known to be used for spam messages can be placed in a "black list" that will be used to discard any messages regardless of threshold from such addresses.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for detecting an undesirable condition within a wireless messaging network, the method comprising:
   (a) receiving a message, the message comprising a source address;
   (b) updating a computer-based data store to preserve (i) the source address, (ii) a source counter, and (iii) an array of timestamps, wherein (i) the source counter is set to a predetermined number on the first observance of the source address and incremented by a predetermined number on each subsequent observance of the source address and (ii) a timestamp entry corresponding to a time at which the message was received is added to the array of timestamps each time the source counter is changed;

(c) iterating through the array of timestamps on a scheduled basis to remove timestamp entries from the array of timestamps that are older than a predetermined time and decrementing the source counter for each timestamp entry so removed;

(d) comparing the source counter to a predetermined threshold; and (e) when the source counter exceeds the predetermined threshold triggering an alarm indicative of an undesirable condition.

2. The method of claim 1, wherein the message is a Short Message Service message.

3. The method of claim 1, wherein the alarm is disregarded if a white list comprises the source address.

4. The method of claim 1, wherein the undesirable condition comprises spam.

5. The method of claim 1, wherein the undesirable condition comprises a routing loop.

6. A method for detecting an undesirable condition within a wireless messaging network, the method comprising:

(a) receiving a message, the message comprising a source address and a destination address;

(b) updating a computer-based data store to preserve (i) the source address, (ii) the destination address, (iii) a destination counter, and (iv) an array of timestamps, wherein (i) the destination counter is set to a predetermined number on the first observance of a combination of the source address and the destination address and incremented by a predetermined number on each subsequent observance of the combination and (ii) a timestamp entry corresponding to a time at which the message was received is added to the array of timestamps each time the destination counter is changed;

(c) iterating through the array of timestamps on a scheduled basis to remove timestamp entries from the array of timestamps that are older than a predetermined time and decrementing the counter for each timestamp entry so removed;

(d) comparing the counter to a predetermined threshold; and (e) when the counter exceeds the predetermined threshold triggering an alarm indicative of an undesirable condition.

7. The method of claim 6, wherein the message is a Short Message Service message.

8. The method of claim 6, wherein the alarm is disregarded if a white list comprises the source address.

9. The method of claim 6, wherein the alarm is disregarded if a white list comprises the destination address.

10. The method of claim 6, wherein the alarm is disregarded if a white list comprises the combination of the source address and the destination address.

11. The method of claim 6, wherein the undesirable condition comprises spam.

12. The method of claim 6, wherein the undesirable condition comprises a routing loop.

* * * * *